3,812,204
POLYMERIC COMPOSITION COMPRISING POLYVINYL CHLORIDE
Giulio Natta, Enrico Beati, and Febo Severini, Milan, and Silvio Toffano, Bergamo, Italy, assignors to Montecatini Edison S.p.A., Milan, Italy
No Drawing. Continuation of application Ser. No. 12,462, Feb. 19, 1970, which is a continuation-in-part of application Ser. No. 375,663, June 16, 1964, both now abandoned. This application Apr. 28, 1972, Ser. No. 248,592
Int. Cl. C08f 15/00
U.S. Cl. 260—878 R                    1 Claim

ABSTRACT OF THE DISCLOSURE

Polymeric compositions comprising graft copolymers of vinyl chloride and from 2% to 25% by weight of an amorphous ethylene copolymer, which compositions are directly useable as produced, without solvent extraction, in the manufacture of shaped articles having commercially acceptable mechanical properties including impact strength, are provided. The compositions are obtained by polymerizing vinyl chloride in contact with the amorphous ethylene copolymer and an initiator of the vinyl chloride polymerization.

---

This application is a continuation of application S.N. 12,462, filed Feb. 19, 1970, now abandoned, which in turn is a continuation-in-part of application S.N. 375,663, filed June 16, 1964, now abandoned.

THE PRIOR ART

French Pat. No. 1,177,940 describes the preparation of graft copolymers by polymerizing vinyl chloride in the presence of peroxidized amorphous polypropylene, followed by solvent extraction of the crude product obtained. Such solvent extraction of the crude polymeric product is necessary in order to obtain a product which can be used in the manufacture of shaped articles having acceptable mechanical properties, including good tensile and impact strength.

It has been established that when vinyl chloride is polymerized in contact with peroxidized amorphous polypropylene, under the conditions of the French patent, the crude polymeric product obtained is not useable, directly, for the manufacture of shaped articles having acceptable mechanical properties.

The French patent indicates that results similar to those obtained starting with peroxidized amorphous polypropylene can be obtained by polymerizing vinyl chloride in contact with non-peroxidized amorphous polypropylene and a peroxide such as benzoyl peroxide.

In that case, also, the crude product obtained must be subjected to solvent extraction in order to obtain a product having useful mechanical properties.

For instance, when vinyl chloride was polymerized in contact with an amorphous (atactic) polypropylene and benzoyl peroxide as initiator of the vinyl chloride polymerization, the crude polymeric product obtained could not be formed into a coherent film or sheet by calendering. The result of the calendering was a mass of discrete granules having different dimensions and which, when molded, yielded a tacky material having poor mechanical properties and lacking utility for any practical purpose.

The French patent further indicates that graft copolymers can be obtained by polymerizing vinyl chloride in contact with a peroxidized amorphous olefin copolymer, more particularly of ethylene and propylene or butene-1, and then subjecting the crude polymeric product to solvent extraction.

In all of the various embodiments of the French patent, solvent extraction of the crude polymeric product is contemplated, or is necessary, to obtain final products capable of being formed into shaped articles having good tensile strength and a resilience, i.e., resistance to impact, vibrations and other dynamic stresses, comparable to the resilience of conventional plasticized polyvinylchloride.

Such solvent extraction of the crude polymeric product is tedious and expensive.

THE PRESENT INVENTION

The primary object of this invention was to provide polymeric compositions comprising a graft copolymer of vinyl chloride and an amorphous ethylene copolymer, which products are directly useable as such, without solvent extraction, in the manufacture of shaped articles having commercially acceptable mechanical properties, including a high degree of resilience coupled with outstanding hardness.

This and other objects are achieved by the present invention according to which vinyl chloride is polymerized in contact with an initiator of vinyl chloride polymerization and an amorphous ethylene copolymer under conditions such that there is produced a crude product consisting of an intimate mixture comprising non modified rubber, PVC homopolymer and polyvinyl chloride grafted on the rubber, the amount of polyvinylchloride in the graft copolymer being from 15% to 75% by weight and the amount of total rubber ranging from 2 to 25% by weight of the total crude product.

The amorphous ethylene copolymer which forms the backbone of the graft copolymer has a molecular weight of from 1,000 to 500,000 and is either an amorphous binary copolymer of ethylene and a higher alpha-olefin such as propylene or butene-1, or an amorphous ternary copolymer of ethylene, a higher alpha-olefin such as propylene or butene-1, and a dienic hydrocarbon, such as, for instance, dicyclopentadiene, butadiene, cyclooctadiene-1,5, etc. In addition, the dienic hydrocarbon may be a non-conjugated diene with linear or cyclic chains.

In preparing the present high-impact polymeric compositions, the olefin copolymers, which are normally linear, can be used as such or after partial cross-linking thereof. The polymerization of vinyl chloride in the presence of a partially cross-linked ethylene copolymer according to the invention results in polymeric compositions having very good mechanical properties characterized in having a high degree of resiliency without appreciable decrease in hardness.

Because of the very low brittle point of the amorphous ethylene copolymers, it is possible to obtain polymeric compositions comprising graft copolymers containing 25 to 85% by weight of the ethylene copolymers having chains of polyvinylchloride grafted thereon, which compositions are capable of maintaining, even at low temperatures below 0° C., the good mechanical properties exhibited thereby at temperatures above 0° C.

The initiators used for the graft polymerization include organic peroxidic compounds which are soluble in monomeric vinyl chloride, such as benzoyl peroxide, lauroyl peroxide, tertiary butyl peroxide, and water-soluble initiators such as hydrogen peroxide, alkaline persulfates, and percarbonates. In addition, there may be used azo compounds such as, for example, azodiisobutyronitrile, dimethyl ester of $\alpha,\alpha'$-azobutyric acid, $\alpha,\alpha'$-azodinitrile of $\alpha,\gamma$-dimethylvalerianic acid.

The polymerization of the vinyl chloride in contact with the amorphous ethylene copolymer and an organic peroxidic initiator is carried out in an oxygen-free atmosphere at temperatures ranging from about 50° C. to 100° C. However, temperatures ranging from about 0° C. to 50° C. can be employed if a Redox mixture is used as the polymerization initiator.

The Redox mixtures which can be used consist of (a) an oxidizing agent such as an organic or inorganic peroxide and (b) of a reducing agent such as oxidizable metal ions (ferrous ion or the corresponding chomium, nickel or copper compounds, in the form of simple salts, e.g., ferrous sulphate, or of complex salts such as ferrocyanides, phenantrolinic complexes, acetylacetonates, etc.), alkaline sulfites, polyethyleneamines, mercaptans, and hydrazine.

The graft polymerization can be carried out in a number of ways which include, for example, dissolving the unmodified (non-peroxidized) polymer in the vinyl chloride in the presence of the initiator which is dispersed in water with a suitable suspending agent (e.g., water soluble organic colloids, such as proteinic materials, e.g. gelatin or glutin), cellulosic materials (e.g. hydroxymethylcelluose, methylcellulose, methylhydroxypropylcellulose etc.), carbohydrates (e.g., starch, alginates) and synthetic materials (e.g., polyvinylpyrrolidone, polyvinylalcohol, partially hydrolized polyvinylacetate, aliphatic esters of polyethylene glycols, etc.). This mixture is subsequently heated to the proper temperature, e.g. 0° to 90° C., at which the polymerization is carried out. At the end of the reaction, the product obtained is in a granular form and can be separated from the suspending liquid and then dried.

The graft polymerization of vinyl chloride in the presence of a cross-linked olefin polymer, copolymer or terpolymer which is insoluble in the monomer can be carried out in the following manner: the binary copolymer or the terpolymer to be used as backbone of the graft copolymer is dissolved or swollen in a solvent such as heptane, toluene, or benzene which contains a suitable cross-linking agent such as benzoyl peroxide or dicumyl peroxide. The mixture is emulsified in water in the presence of a surface-active agent. From the latex mixture, after distillation of the solvent, a stable aqueous emulsion of the copolymer or terpolymers is obtained which is then cross-linked by heating to a temperature, e.g., 50° C. to 150° C., at which the decomposition of the peroxide used as the cross-linking agent proceeds at a good rate. The cross-linking of terpolymers containing sufficients amount (0.1 to 20% by weight) of a dienic hydrocarbon can be carried out by means of a vulcanizing agent of the normally used for the vulcanization of unsaturated rubbers.

A latex containing the cross-linked polymer, vinyl chloride, and the initiator is introduced into an autoclave provided with a propeller agitator. The whole mixture is heated to the desired polymerization temperature and at the end of the reaction a suspension is discharged from which the polymeric material is separated in granular form by simple filtration.

The polymeric compositions obtained according to the process of this invention have good mechanical properties which do not vary with time and are believed to be due to the saturated nature of the ethylene/higher alpha-olefin copolymers or ethylene/higher alpha-olefin/diene terpolymers, and to the fact that the copolymer or terpolymer is chemically bound to chains of the polyvinylchloride.

The plastic mass, i. e., the total or crude polymeric composition as produced, after the addition of a suitable stabilizer (e.g., basic lead carbonate, lead orthosilicate, dibasic lead phthalate, cadmium or barium stearates, naphthenates or ricinoleates, tin alkyl or aryl compounds, alkaline phosphates), can be easily processed in roll mixers and used for the preparation of films or in the field of packaging. The use of these plastic materials in the field of packaging food is particularly interesting. In addition, the raw plastic compositions of this invention as produced and without solvent extraction, can be used for the manufacture of various articles including pipes, containers, translucent sheets, corrugated sheets, and various other articles exhibiting good rigidity and improved impact strength.

The following examples are given to illustrates the products and processes of this invention.

Example 1

Approximately 30 g. of an ethylene-propylene copolymer containing 45% by mols of ethylene, together with 200 cc. of boiled water and 4 g. of polyvinyl alcohol, were introduced into a 1.8 liter stainless steel autoclave provided with a propeller agitator. The ethylene-propylene copolymer was prepared in accordance with Italian Pat. No. 554,803 and had an intrinsic viscosity, as determined in toluene at 30° C., of 2.12 dl./g. The air was eliminated by flushing the autoclave with pure nitrogen and about 350 cc. of liquid vinyl chloride were introduced. The mixture was left standing for about 18 hours so as to allow the polymer to swell and partially dissolve in the monomer. While keeping the mixture under vigorous agitation, the reaction mass was gradually heated to about 70° C. and then held at this temperature for about 2 hours. About 600 cc. of boiled and distilled water and 1.2 g. of benzoyl peroxide were introduced through an injection pump and the mixture was held at 70° C. for another 14 hours with vigorous agitation.

After cooling the unreacted vinyl chloride was eliminated and the polymer was discharged in the form of white pearls. After filtration and washing with water, about 250 g. of a dry material containing about 12% of the copolymer were obtained.

This crude product was stabilized with 1% of tin dibutyl laurate and 3% of dibasic lead stearate, and then calendered at 150° C. to 160° C. A translucent sheet was obtained and molded at 160° C. The molded material had the following characteristics:

TABLE I

Izod Resiliency (ASTM D256–56)
(kg. cm./cm. of notch):
    23° C. ---------------------------- Does not break.
    0° C. ---------------------------------- 12.4
Rockwell Hardness (ASTM D785–54):
    R ---------------------------------------- 100.
    L ---------------------------------------- 49.
    M ----------------------------------------

As noted, the dry material remaining after the filtration, washing with water and drying operations, contained about 12% of the ethylene/propylene copolymer therein. Part of this amount was under the form of nonmodified rubber, the balance being under the form of grafted copolymer. The form was determined by extracting the crude polymeric product with n-heptane in a Kumagawa extractor, on which it was found that the amount of unreacted copolymer taken from the polymerization reactor amounted to about 37.5% of the amount of copolymer added to the autoclave initially. The extraction was solely for the purpose of determining the percent ethylene/propylene copolymer bound in the crude product which was stabilized, calendered to obtain the translucent sheet which was molded to obtain a product having the properties given in Table I.

For purposes of comparison, a conventional polyvinyl chloride was prepared by introducing into the same stainless steel autoclave about 750 cc. of boiled and distilled water, 1 g. of polyvinyl alcohol and 0.4 g. of lauryl peroxide. After elimination of the air by flushing with nitrogen, about 300 cc. of liquid vinyl chloride were added to the autoclave. The agitator was started and the suspension was heated to a temperature of 60° C. for about 11 hours.

After cooling, the unreacted vinyl chloride was eliminated and the polymer was discharged in the form of a fine white powder which was separated from the water by filtration. After washing with water and drying at 50° C., about 210 g. of polymer were obtained. This polyvinyl chloride had an intrinsic viscosity as determined in cyclohexanone at 30° C. of 0.96, which corresponds to a Fikentscher's constant of 66.

The product was stabilized, calendered and molded as above and was found to have the following properties:

TABLE II

Izod Resiliency (kg. cm./cm. notch):
23° C. ------------------------------------ 4.8
0° C. ------------------------------------ ---
Rockwell Hardness:
R ------------------------------------ 100
L ------------------------------------ 84
M ------------------------------------ 45

Example 2

Approximately 35 g. of an ethylene-propylene-cyclooctadiene terpolymer containing 55% by mols of propylene and 3% of cyclooctadiene and 290 cc. of distilled and boiled water containing 6 g. of polyvinyl alcohol were introduced into the autoclave of Example 1. The terpolymer was prepared in accordance with the disclosure in Italian Pat. No. 660,432 granted Feb. 17, 1964 and had an intrinsic viscosity, as determined in toluene at 30° C., of 1.22.

After eliminating the air, about 300 cc. of liquid vinyl chloride were introduced and the entire mixture was left standing for 18 hours at room temperature. The mixture was then agitated and the temperature was raised to about 70° C. After about 5 hours, 650 cc. of boiled water and 1.4 g. of benzoyl peroxide were injected into the mixture. The mixture was held in a state of agitation at 70° C. for another 17 hours. After cooling, the polymer was discharged in the form of a fine white powder.

After filtration and washing with water, about 250 g. of dry material were obtained. It contained about 7% of the terpolymer. The crude polymeric product obtained from the reactor was mixed with an equal amount of polyvinyl chloride (KO Vipla powder) and the mixture was stabilized with 1% by weight of tin dibutyl laurate and 3% by weight of a di-basic lead stearate. The stabilized mixture was calendered at a temperature of 150° to 160° C. A sheet was obtained which was then molded at 260° C. The molded material, which contained about 7% of the terpolymer has the following mechanical properties:

TABLE III

Izod Resiliency (kg. cm./cm. of notch):
23° C. ------------------------------------ 12.2
0° C. ------------------------------------ 10.4
Rockwell Hardness:
R ------------------------------------ 100
L ------------------------------------ 65
M ------------------------------------ 34

Extraction of the crude polymeric material with n-heptane in a Kumagawa extractor, carried out solely to determine the amount of terpolymer bound in the crude polymeric material and the amount of unreacted terpolymer taken from the polymerization reactor, established that the unreacted terpolymer amounted to about 27% of the amount thereof added to the autoclave initially.

Example 3

About 15 g. of an ethylene-butene-1 copolymer containing 33% by mols of butene-1 and 200 cc. of distilled and boiled water containing 2 g. of polyvinyl alcohol were introduced into the autoclave of the preceding examples. The copolymer was prepared according to Italian Pat. No. 554,803 and had an intrinsic viscosity as determined in toluene at 30° C. of 2.9. Air was eliminated from the reactor and about 200 cc. of liquid vinyl chloride were injected. The mixture was left to stand for about 15 hours. The agitator was started and the mixture was heated to 70° C. for two hours. After the addition of about 400 cc. of boiled water and 1 g. of benzoyl peroxide, the polymerization reaction was left to proceed for about 12 hours at 70° C. After cooling, the unreacted vinyl chloride was eliminated and the polymer was discharged in the form of a fine white powder. After filtration and washing, about 115 g. of dry material were obtained. The crude product which contained 13% of the ethylene-butene-1 copolymer was then mixed with polyvinyl chloride (KO Vipla) to the extent that the mixture contained about 12% of the graft copolymer. The mixture was stabilized, calendered and molded in the same manner as in Examples 1 and 2. The stabilized material resulted in a product having the following characteristics:

TABLE IV

Izod Resiliency (kg. cm./cm. of notch):
23° C. -------------------------- Does not break.
0° C. -------------------------- 23.
Rockwell Hardness:
R ---------------------------- 93.
L ---------------------------- 37.
M ----------------------------

By extraction with n-heptane in a Kumagawa extractor, it was determined that the unreacted ethylene/butene-1 copolymer which did not participate in the graft copolymerization reaction corresponded to about 35% of the amount of said copolymer introduced into the reactor initially.

Example 4

Approximately 10 g. of the ethylene-propylene copolymer used in Example 1 and 90 g. of toluene were mixed at room temperature. After about 24 hours the mixture was agitated until a very viscous paste free of clots was obtained. About 6 g. of an ammonium salt of sulfuric acid ester of alkylphenoxypolyethyleneoxyethanol (Fenopon Co 436), 180 g. of water and 0.4 g. of $NaH_2PO_4 \cdot H_2O$ were added to the polymeric mixture. The mixture was then homogenized in an Ultra Turrax type of emulgator for about 5 minutes. The toluene was removed from the emulsion of distillation under reduced pressure as a toluene-water azeotrope. The emulsion obtained was then mixed with about 1 g. of benzoyl peroxide and diluted with 300 cc. of distilled and boiled water and placed in an autoclave provided with a propeller agitator.

After the air was eliminated, approximately 160 cc. of liquid vinyl chloride were introduced, and the temperature was raised to 70° C. of vigorous agitation. After about 6 hours, the polymerization reaction was stopped. After cooling, the unreacted vinyl chloride was eliminated and the reaction mixture was discharged. During the polymerization of the vinyl chloride, the initial emulsion was completely broken and the reaction product was in the form of a very fine and bulky soft pearls which absorbed water almost completely. After filtration and washing with water, 87 g. of dry product were obtained which were found to contain about 11.5% of the copolymer. The crude product was stabilized, calendered and molded in the same manner as the preceding examples and resulted in a material having the following mechanical properties:

TABLE V

Izod Resiliency (kg. cm./cm. of notch):
23° C. ------------------------------------ 9.2
0° C. ------------------------------------- 6.1
Rockwell Hardness:
R ---------------------------------------- 97
L ---------------------------------------- 52
M ---------------------------------------- 23

Example 5

Approximately 25 g. of the ethylene-propylene copolymer used in Example 1 were mixed with 330 g. of toluene at room temperature. After about 24 hours, the mixture was agitated until a homogeneous paste was obtained. About 0.75 g. of dicumyl peroxide, 12.5 g. of Fenopon Co 436, 250 cc. of water and 1.5 g. of $NaH_2PO_4 \cdot H_2O$ were added to the polymeric mixture. The mixture was then homogenized for about 5 minutes in an Ultra Turrax type of emulgator. Toluene was removed from the emulsion by distillation under a reduced pressure as toluene-water azeotrope. The polymeric emulsion was then heated in an autoclave with agitation at 140–150° C. under a nitrogen atmosphere. After about 2 hours of heating, the mass was left to cool with agitation and an emulsion containing cross-linked copolymers was obtained. A portion of this latex copolymer was added to methanol and the polymer separated was subjected to extraction with n-heptane in a Kumagawa extractor for 8 hours. The heptane extract contained 40% of the initial polymer which represents the non-cross linked fraction. A portion of the emulsion containing 8 g. of ethylene-propylene copolymer was diluted to 400 cc. with distilled and boiled water and then introduced into an autoclave with 0.5 g. of benzoyl peroxide. After eliminating the air by flushing with nitrogen, about 120 g. of liquid vinyl chloride were added to the autoclave. While holding the mass in a state of agitation, the autoclave was heated to about 70° C. and held at this temperature for about 17 hours. The unreacted vinyl chloride was eliminated after the mixture had cooled and the polymer was discharged from the reactor in the form of a soft pearl. It was separated from the water and emulsifier by means of a centrifuge. After drying the product at 50° C., about 70 g. of dry material containing 11.5% of copolymer were obtained. The product was stabilized, calendered and molded in the manner taught in the preceding examples and was found to have the following properties:

TABLES VI

Izod Resiliency (kg. cm./cm. of notch):
23° C. ------------------------- Does not break
0° C. ------------------------------------- 10
Rockwell Hardness:
R ---------------------------------------- 98
L ---------------------------------------- 55
M ---------------------------------------- 25

Example 6

Approximately 60 g. of an ethylene-propylene-cyclooctadiene terpolymer containing about 3% by mols of the cyclooctadiene and 55% by mols of propylene were mixed with 400 g. of toluene. The terpolymer had an intrinsic viscosity as determined in toluene at 30° C. of about 1.08. The toluene mixture was held for about 25 hours and then agitated until a homogeneous paste was obtained. About 2.4 g. of benzoyl peroxide were added to the mixture and then after about 30 minutes of further agitation, 24 g. of Fenopon Co 436 and 250 cc. of water with 1.5 g. of $NaH_2PO_4 \cdot H_2O$ were added. This mixture was then homogenized for about 5 minutes in an Ultra Turrax type of emulgator. The emulsion was freed from the toluene by distillation under reduced pressure by means of a water-toluene azeotrope. The polymeric emulsion was then heated in an autoclave at 100° C. with agitation under nitrogen. After about 2 hours, the heating was stopped and the mass was left to cool with agitation. The emulsion containing the cross-linked terpolymer was then discharged from the reactor. A portion of the latex was poured into methanol and the polymer which separated was subjected to extraction with n-heptane in a Kumagawa extractor for about 8 hours. The heptane extract contained about 40% of the initial polymer which is the non-cross-linked portion.

A portion of the emulsion which contained 10 g. of the terpolymer was diluted to 400 cc. with distilled and boiled water and then introduced into an autoclave with 0.5 g. of benzoyl peroxide. After eliminating the air by flushing with nitrogen, 120 cc. of liquid vinyl chloride were added to the reactor. While maintaining the mass in the state of agitation, the autoclave was heated to 70° C. and held for about 17 hours. The unreacted vinyl chloride was eliminated after the reaction mass had cooled and the product was discharged in the form of soft pearls. The product was separated from the water and the emulsifier by means of a centrifuge.

After drying the product at 50° C., about 60° g. of product were obtained. This crude product was mixed with about 25 g. of polyvinyl chloride. The mixture which contained about 11.8% of the terpolymer was stabilized, calendered and then molded as in the preceding examples. The finished product had the following mechanical properties:

TABLE VII

Izod Resiliency (kg. cm./cm. of notch):
23° C. ------------------------------------ 19.5
0° C. ------------------------------------- 111
Rockwell Hardness:
R ---------------------------------------- 100
L ---------------------------------------- 63
M ---------------------------------------- 34

Example 7

Approximately 500 cc. of distilled and boiled water, 5 g. of sodium lauryl sulfate, 2 g. of ammonium persulfate and 0.8 g. of sodium metabisulfate were introduced into the autoclave of Example 1.

After eliminating the air by flushing with pure nitrogen, about 250 cc. of liquid vinyl chloride were injected. The emulsion polymerization proceeded under these conditions at room temperature. After about 8 hours, agitation was stopped and the unreacted vinyl chloride was eliminated. The emulsion containing about 23% of polyvinyl chloride was discharged from the reactor. The polyvinylchloride in emulsion had an intrinsic viscosity as determined in cyclohexanone at 30° C. of 0.97, which corresponds to a Fikentscher's constant of 67.5. An emulsion of an ethylenepropylene copolymer was prepared separately by operating as in Example 5 and the two emulsions were then mixed so as to obtain 12 parts by weight of the copolymer and 88 parts by weight of the polyvinyl chloride in the final mixture. The emulsion mixture was broken with methanol and the polymer was precipitated in the form of a very fine powder which was separated by a centrifuge. The product was washed with water and dried. The final material was stabilized, and molded as in the preceding examples and found to have the following properties:

TABLE VIII

Izod Resiliency (kg. cm./cm. of notch):
23° C. ------------------------------------ 1.2
0° C. ------------------------------------- 1.1
Rockwell Hardness:
R ---------------------------------------- 59

By comparing the above data with that given for Examples 4 and 5, it is clearly noted that the compositions comprising the graft polymers obtained according to the process of this invention have outstanding characteristics compared to those of a mechanical mixture as described in this example.

Example 8

Approximately 13 g. of an ethylene-butene-1 copolymer as set forth in Example 3 and 0.52 g. of benzoyl peroxide were contacted with 138 g. of toluene. This viscous solution was agitated until the clots disappeared. While agitating, about 6 g. of Fenopon Co 436, 150 cc. of distilled water and 0.5 g. of $NaH_2PO_4$ were added. The mixture was homogenized for about 5 minutes in an Ultra Turrax type of emulgator. The emulsion was freed of the toluene by distillation under reduced pressure by means of a toluene-water azeotrope. The polymeric emulsion was then heated with agitation at 100° C. for 2 hours under nitrogen. A portion of the emulsion was poured into methanol. The polymer separated was subjected to an extraction with n-heptane in a Kumagawa extractor for about 8 hours. The heptane extract contained about 37% of the initial polymer which represents the non-cross linked fraction. The remaining emulsion containing about 12 g. of the copolymer was placed in an autoclave with about 1 g. of benzoyl peroxide and 400 cc. of distilled and boiled water. After eliminating the air, about 150 cc. of liquid vinyl chloride were introduced into the reactor. The autoclave was heated to about 70° C. for 7 hours with agitation. The unreacted vinyl chloride was then eliminated after cooling and the polymer was discharged in the form of fine, bulky pearls. The polymer was then separated from the water and emulsifier by means of a centrifuge.

After drying the product at 50° C., about 80 g. of material were obtained. This product was then mixed with 20 g. of polyvinyl chloride. The material which contained about 12% of the copolymer was then stabilized and molded as in the preceding examples and found to have the following characteristics:

TABLE IX

Izod Resiliency (kg. cm./cm. of notch):
    23° C. _____ Does not break.
    0° C. _____ 11.5.
Hockwell Hardness:
    R _____ 97.
    L _____ 49.
    M _____

The crude (total) polymeric compositions of the invention containing from 2% to 25% of the amorphous ethylene copolymer and which, as such, are characterized by high impact strength and outstanding hardness consist of mixtures.

Thus, the crude polymeric compositions containing an amorphous ethylene/higher alpha-olefin binary copolymer consist of an intimate mixture of (a) the homopolymer, polyvinylchloride;
(b) a graft copolymer in which chains of polyvinylchloride are grafted onto a backbone which is the ethylene/higher alpha-olefin copolymer; and
(c) unreacted ethylene/higher alpha-olefin copolymer which did not participate in the graft copolymerization reaction.

The composition of the mixture, that is, the relative amounts of the three components therein, can be determined by separating the components. In the case of compositions in which the backbone of the graft copolymer is an ethylene/propylene binary copolymer, the separation can be accomplished by the following procedure: suspending the raw (total) polymeric composition in tetrahydrofuran, pouring the suspension on Celite, removing the solvent, introducing the residue into a chromatographic column, and treating it, in the column, with n-heptane at 60° C. to dissolve component (c); with dimethylformamide at 30° C. to dissolve component (a); and with tetrahydrofuran at 60° C. to dissolve component (b).

Using the procedure described on a total (raw) polymeric composition obtained according to the invention and containing about 9% of amorphous ethylene/propylene copolymer, it was found that the total composition contained from about 4% to 12% by weight of component (b); that the weight percent of polyvinylchloride in component (b) was between 15 and 40; and that the amount of component (c) in the total composition was from 3% to 5% by weight, the balance being component (a).

The raw (total) polymeric compositions of the invention in which the backbone of the graft copolymer is an amorphous ethylene/higher alpha-olefin/diene terpolymer also consist of mixtures and have, as such, high impact strength and exceptional hardness. Those compositions are comprised of an intimate mixture of (a) the homopolymer, polyvinylchloride;
(b) a graft copolymer in which chains of polyvinylchloride are grafted on the ethylene/higher alpha-olefin/diene terpolymer backbone; and
(c) unreacted ethylene/higher alpha-olefin/diene terpolymer which did not participate in the graft copolymerization reaction.

The relative amounts of the three components in the compositions can be determined. Thus, when the backbone is an ethylene/propylene/diene terpolymer, the amount of component (c) in the composition can be determined in the same way as described above for determining the amount of free, unreacted ethylene/propylene copolymer, i.e., by treatment of the composition with n-heptane at 60° C. The amount of component (b) can be determined by extracting component (a) with cyclohexanone and weighing the dry residue consisting of component (c) plus the graft terpolymer on which the poly1 vinylchloride content is determined. The weight and composition of the grafted product can be calculated by taking into account the amount of component (c) present in the residue after the extraction with cyclohexanone.

Applying the said procedure to a total polymeric composition according to the invention and containing about 9% by weight of amorphous ethylene/propylene/diene terpolymer, it was found that the composition contained from 0.5% to 3% by weight of component (c), depending on the specific diene component of the terpolymer; from 12% to 20% of the graft copolymer (b); and that said component (b) contained from about 30% to 60% of polyvinylchloride.

In general, the raw compositions of the invention which contain from 2% to 25% of the amorphous ethylene binary or ternary copolymer, and which are used as such, without solvent extraction, for the manufacture of shaped articles having high impact strength and outstanding hardness, contain from about 4% to 20% of the graft copolymer containing from 15% to 60% of polyvinylchloride; and from about 0.5% to 5% of free ethylene/higher alpha-olefin binary copolymer or ethylene/higher alpha-olefin/diene ternary copolymer, the balance being the PVC homopolymer.

It is well known that one requirement for commercially acceptable thermoplastic polymeric materials is the ability to be processed satisfactorily on a roll-mixer. A very important advantage of the present composition is that, as produced, without solvent extraction, and after the addition of stabilizing agents, these compositions can be mixed very readily on conventional roll-mixers to yield continuous sheets having a unitary, homogeneous appearance and which, as shown in the examples, can be molded into shaped articles having a high degree of resilience coupled with outstanding hardness.

Some modifications in details can be made in practicing this invention without departing from the spirit thereof.

What is claimed is:

1. A crude polymeric composition consisting of a mixture of (a) 4 to 20% by weight of a graft copolymer of vinyl chloride and an amorphous, rubbery, optionally cross-linked terpolymer of ethylene, propylene or butene-1 and a diene hydrocarbon, said rubbery terpolymer having a molecular weight of from 1,000 to 500,000; (b) 0.5–5% by weight of free, ungrafted, optionally cross-linked, rubbery terpolymer of ethylene, propylene or butene-1 and a diene hydrocarbon; and (c) 75 to 95.5% by weight of free vinyl chloride homopolymer; the total amount of rubbery terpolymer in said polymeric composition being from 2 to 25% by weight.

References Cited
FOREIGN PATENTS

| | | | |
|---|---|---|---|
| 1,177,940 | 4/1959 | France | 260—878 R |
| 598,109 | 5/1960 | Canada | 260—878 R |

JOSEPH L. SCHOFER, Primary Examiner

A. HOLLER, Assistant Examiner

UNITED STATES PATENT AND TRADEMARK OFFICE
CERTIFICATE OF CORRECTION

PATENT NO. : 3,812,204
DATED : Issue May 21, 1974
INVENTOR(S) : Giulio Natta et al It is certified that error appears in the above-identified patent and that said Letters Patent are hereby corrected as shown below:

Col. 1, line 12, "Claims priority, application Italy, July 17, 1963, 12,620/63" should be inserted..

Col. 3, line 20, "chomium" should read "chromium"

line 33, "hydroxymethylcelluose" should read "hydroxymethylcellulose"

line 61, "type" has been omitted BEFORE "normally"

Col. 10, line 36, "polylvinylchoride" should read "polyvinylchloride"

Signed and Sealed this twenty-fifth Day of November 1975

{SEAL}

Attest:

RUTH C. MASON
Attesting Officer

C. MARSHALL DANN
Commissioner of Patents and Trademarks